Feb. 9, 1971  F. I. CATLIN ETAL  3,561,138
AUDIOMETRY TRAINING UNIT
Filed Nov. 7, 1969  3 Sheets-Sheet 1

SIMPLIFIED BLOCK DIAGRAM

INVENTORS
FRANCIS I. CATLIN
ROBERT N. GLACKIN, Jr.

BY John Gibson Semmes
ATTORNEY

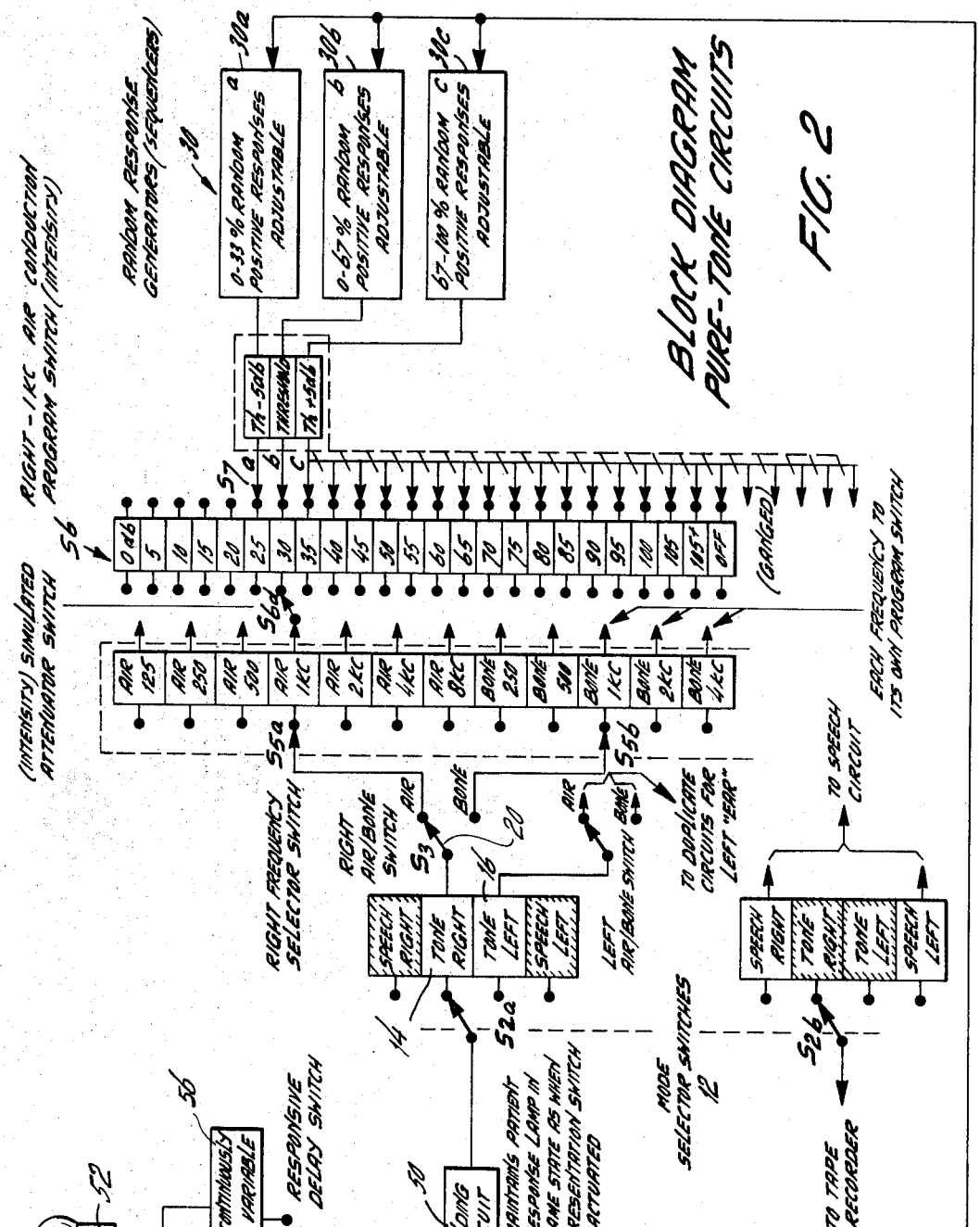

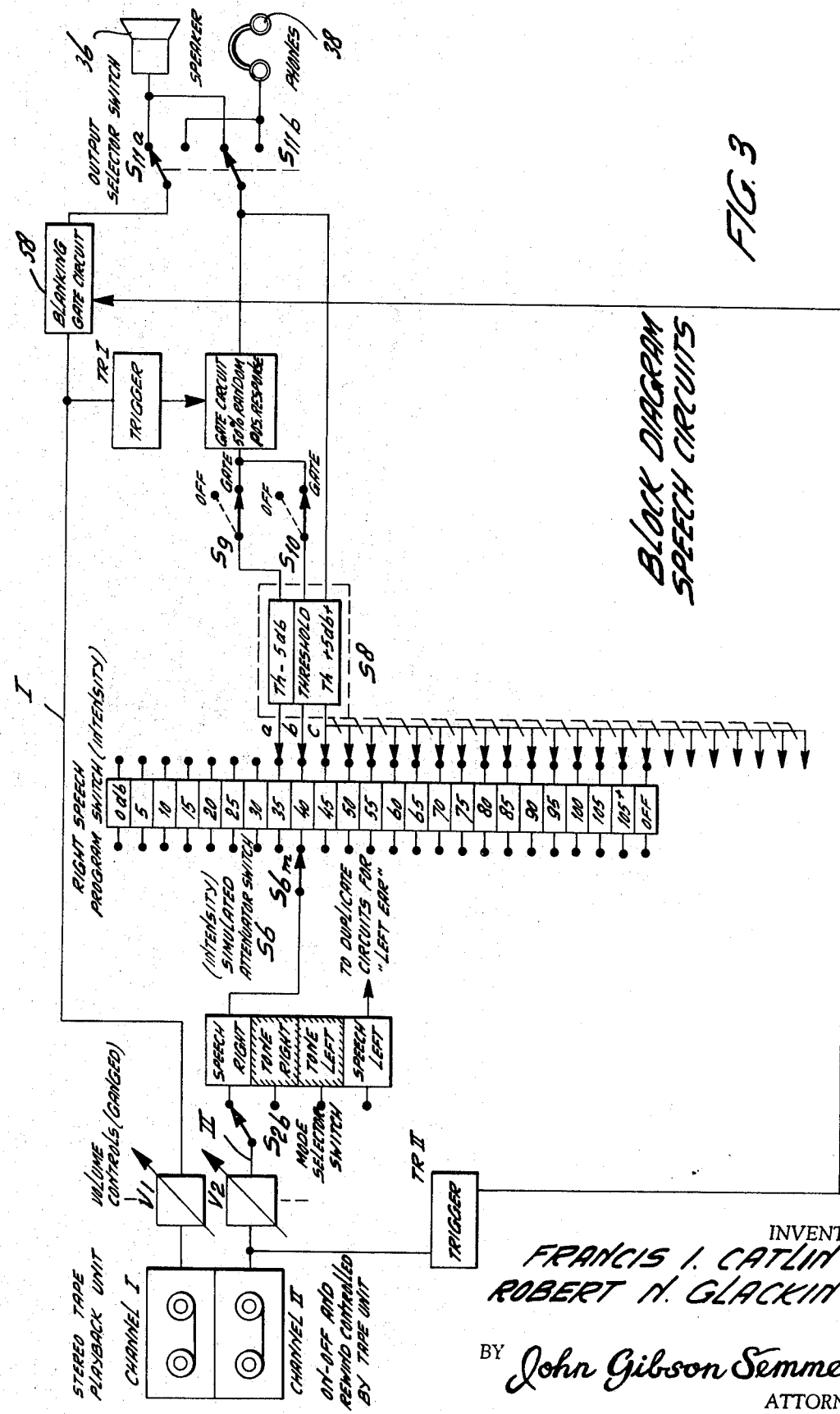

3,561,138
AUDIOMETRY TRAINING UNIT
Francis I. Catlin, Towson, and Robert N. Glackin, Jr., Cockeysville, Md., assignors to The Johns Hopkins University, Baltimore, Md., a corporation of Maryland
Filed Nov. 7, 1969, Ser. No. 874,806
Int. Cl. G09b 25/00
U.S. Cl. 35—13           11 Claims

ABSTRACT OF THE DISCLOSURE

Audiometry Training Unit primarily directed to a technician teaching machine using programmed instruction and/or simulation techniques to provide a trainee with experience in the theory and practicum of the evaluation of hearing, in the absence of live human test subjects. The unit facilitates practicing and following an actual testing procedure and contemplates different arrangements of simulation devices and/or techniques in the methodology of hearing evaluation in human test subjects to selectively provide a variety of pre-programmed simulated test subject responses which can conform to actual live human test subject response characteristics. Instructor or programmer control of the simulated characteristics is incorporated. The unit is adaptable for, and useful in, testing of hearing by puretone techniques including pure-tone audiometry, hearing for speech, speech intensity, subject response measurements, speech reception threshold, speech discrimination tests, and other normal testing procedures. The system includes a variable patient response circuit to more precisely implement test procedures simulating actual audiometry testing.

BACKGROUND OF THE INVENTION

Conventional audiometric instruction requires and has heretofore used a basic minimum of personnel and equipment including, for example, the student or trainee, the instructor, the test subject, the pure-tone audiometer, the sound-treated room, and optionally the speech audiometer. In addition, the instructor must present a task or program, for the student. Learning is achieved through feedback mechanisms which modify output behavior in accord with certain preformance standards. Two forms of feedback were involved, namely the automatic by-product of output which is internally generated and response dependent, and an externally introduced stimulus, provided by the instructor, which may, for example, tell the student whether he is right or wrong and the reason therefor. The requisite minimum of three people required for traditional methods of audiometric instruction often resulted in group use of teaching methods for administrative convenience, economic saving, and instructor acceptance. This oftentimes resulted in individualized student instruction being limited, and progress of a group might well be delayed by the poorest learner.

Attempts to approach more individualized education resulted in the use of programmed instruction for audiometry. Such materials which were developed were based upon application of programmed teaching methodology to the stimulus-response patterns for continuous pure-tones. While subject programmed audiometric instruction implements individual education, it is a verbal effort which must be translated into behavioural activity by the student who must eventually apprehend the audiometer and test subject. When practicing such a method, however, several conditions tending to depreciate from the end results may be encountered, namely, limited availability of an audiometer, limited availability of a soundproof room, limited availability of a test subject, limited varieties of impaired test subjects as distinguished from a frequent practice of one student testing another, and multiple other factors, such as motivation, test subject variables, room noise, etc.

SUMMARY OF THE INVENTION

The present invention constitutes an improvement in an audiometry training unit which provides basic experience in pure-tone and speech audiometry wherein simulated test procedures can include, for example, air conduction audiometry, bone conduction audiometry, and speech audiometry. The unit essentially constitutes a pre-programmed simulated test subject combined with an audiometer console upon which the basic audiometric procedures may be illustrated, as well as performed, and incorporates selective utilization of test subject response. The unit or device of the invention presents features of interest including, among others: no audiometer is required for basic training, no soundproof room is required, no test subject is required, no speech audiometer is required, the unit is available for use at any time in any location, a variety of pre-set audiometric threshold patterns may be presented to the student, a variety of tone intensity response patterns may be programmed, the unit simulates closely real audiometric controls and techniques, and the unit of practical test procedure instruction is reasonably mobile. The unit as designed provides experience for students in a variety of audiometric tests conducted on a pre-programmed simulated patient which is the training unit and a plurality of different patterns of pure-tone and speech functions can be programmed.

Additional objects, advantages and features of the invention will be more readily apparent from the following detailed description of a preferred system, operable to greatly enhance known teaching techniques, when taken together with the accompanying drawings in which:

FIG. 2 is a block diagram of a pure-tone circuit; and

FIG. 3 is a block diagram of a speech circuit.

Figure 1:
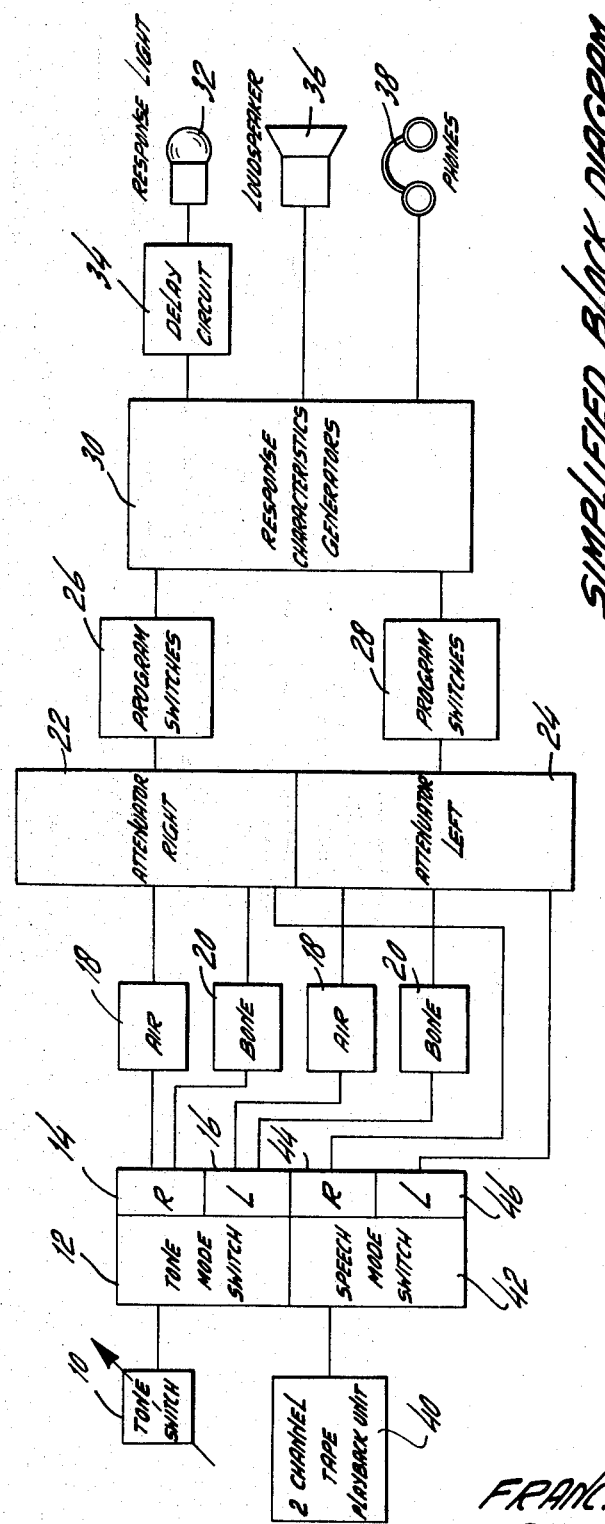
FIG. 1 is a simplified block diagram of the overall audiometry training unit.

Referring to FIG. 1 basically the unit includes the pure-tone circuit and a speech circuit in the overall system or training unit. The tone presentation switch 10 is operable upon activation by a trainee to present a test tone to the unit, and is connected to a tone-mode switch 12 for right 14, and left 16, test tone actuation, each of which in the circuit is connected for air test hearing 18, or bone conduction test 20. These are respectively connected to right attenuator 22 and left attenuator 24, interconnected through program switches 26 and 28 to a series of response characteristics generators generally designated 30. A response light 32 is connected with the response characteristics generators through a delay circuit 34. A loudspeaker 36 and ear phones 38 are also circuit connected to response characteristics generators 30.

The speech circuit includes a two channel tape playback unit 40 circuit connected to a speech mode switch 42 which is likewise operable for right test 44 and left test 46, connected to, respectively, right attenuator 22 and left attenuator 24. These attenuators in the overall circuit are connected as set forth above for the tone circuit. The foregoing described overall training unit circuit broadly indicates the general components leading to presentation of the desired tests to be accomplished by the unit, and the broad mode of presentation of and control of the test medium and circuitry to the test subject by the technician or trainee.

The pure-tone circuit and operation will be more readily understood with reference to FIG. 2 of the drawings. Tone presentation switch 10 which is normally open in operation is pressed by the trainee when he wishes to present a test tone to the unit. Immediately, thereupon a tone on indicator lamp 48 operatively connected in the circuit to the switch will light, indicating that the tone has been presented. This switch activates a holding circuit 50 operable to maintain patient response indicator lamp 52 in the same state or condition as when the tone presentation switch is activated. This holding circuit serves to maintain the random response generators 30 in their current state at the time the presentation switch was pressed either on or off. If an "on" response is obtained from the circuitry beyond switch $S_{2A}$ the patient response indicator lamp 52 lights, and if an "off" response is obtained, this lamp does not light. The patient response passes through one of two delay circuits 54 and 56 (response delay circuits) which are respectively regular and adjustable from a slow to a fast response delay period, or the response delay may be continuously variable. The switch S1 selects the delay circuit to be used. The mode selector switch 12 incorporates the switch $S_{2A}$ and $S_{2B}$ and selects one of four test channels, namely, speech-right ear, tone-right ear, tone-left ear, or speech-left ear, as designated in FIG. 2. The switch $S_{2B}$ is incorporated in the speech circuit and is connected to the tape recorder 40, and will be described in more detail with reference to the speech block diagram.

Switch $S_{2A}$ selects the tone channels for the left or right ear. Switches S3 and S4 are the air/bone switches for the right and left ears respectively. The circuit is shown and will be described with reference to switch S3 for the right, the switch S4 which is for the left is not shown but duplicates that illustrated for the right (S3) channel. From S3 the circuit is connected with switches $S_{5A}$ and $S_{5B}$ which constitute the frequency selector switch for the right channel. This is a ganged switch, as shown, with seven positions for the air channel 18 and 5 positions for the bone channel 20. This switch, as shown, is marked with the simulated test frequencies employed for air (125, 250, 500, 1 kc., 2 kc., 4 kc. and 8 kc.) and for bone (250, 500, 1 kc., 2 kc. and 4 kc.). For each of these twelve frequency positions there is used a wafer on a ganged attenuator switch S6. Thus, the wafer for right-air-1 kc. is designated as $S_{6D}$. Switch S6 is the attenuator switch for the right channel and has twenty-two positions which are marked in five decibel steps, from 0 to 105 decibels, and represent simulated hearing levels. Switch S7 is a program switch which sets the general intensity levels for the response desired by the programmer. A program switch, S7, is provided for every frequency and for speech for both the right and left channels (7 air-right, 5 bone-right, speech right, 7 air-left, 5 bone-left and speech left).

The speech circuits following switch S7 differ from the air circuits and will be described with reference to the speech block diagram in FIG. 3. Switch S7 is a ganged three-contact switch in which the contact marked threshold (Th) plus 5 decibels (db.) and above is tied electromechanically to all contact positions above position $S_{7C}$. Switch S7 may be set to give a threshold response at 0 db. to 105 db. or to an "off" or "no" response position as shown. The contact $S_{7A}$ is the threshold minus 5 db. setting, and is activated by a random response generator 30a to give a random positive response which may be adjusted between 0% and 33% positive responses. Contact $S_{7B}$ is the threshold setting which is activated by another random response generator 30b to give random positive responses from 0% to 67% random positive responses. Contact $S_{7C}$ activates at switch positions of S7 above it to give random positive responses from generator 30c which may be adjusted to give 67% to 100% random positive responses. In operation therefore, by control of the various switches and the components within the circuit, the programmer can select, and has a wide variety of, response characteristics available for the testing. The circuit has intentionally been described in broad circuit and functional characteristics since obviously the individual components, switches, and the like, might vary but this is well within the knowledge of technicians skilled in the art.

The speech circuit shown in FIG. 3 is again indicative of the broad concept, circuit, and functional possibilities and actual circuitry, within the scope of the invention, might be varied by those skilled in the art. An illustrative circuit shown in FIG. 3 includes the tape playback unit 40 which is a two channel affair which uses pre-recorded tapes. The test instructions and test words are given over channel one and the response words over channel two. Different response may be recorded over channel two if desired such as, for example, wrong words, mispronunciation, omissions, etc. The tape playback output is adapted for adjustment by ganged volume controls V1 and V2 or if desired these can be separate. The output of channel one passes through a blanking gate circuit generally indicated at 58, which will be described in more detail hereinafter, and in circuit passes directly therethrough to an output selector switch $S_{11A}$ and $S_{11B}$ which delivers the test signal to either earphones 38 or loudspeaker 36. Channel II passes through volume control V2 to a mode selector switch $S_{2B}$ (see also FIG. 2) which selects the left or right speech channels. The block diagram for the left speech channel is not shown but duplicates that of the right channel. An attenuator switch S6 has a wafer of 22 positions for the right speech channel, indicated $S_{6M}$, and provides a simulated intensity range from 0 to 105 db., in five decibel steps, of a simulated hearing level. A right speech program switch S8 is a ganged three-contact switch in which position C is tied electromechanically to all contact positions thereabove. Contact S8C and above deliver the channel II signal directly to the output selector switch $S_{11B}$, which also is interconnectable with phones 38 or loudspeaker 36. Contact $S_{8B}$ connects to a switch S10 which gives an option of two responses, namely, no response or a 50% random positive response. Contact $S_{8A}$ connects to a switch S9 which also gives an option of two responses, namely no response or a 50% random positive response. The switches S9 and S10 are accordingly termed response condition switches. The gate circuit for channel II which gives the 50% random positive responses is actuated through a trigger circuit TR1 by the test signal on channel I. The blanking circuit through which a channel II signal passes is necessary to prevent crossover of the test signal from channel II via channel I to the output transducers since channel separation of most current stereo-tape playback units is insufficient for this purpose. The foregoing speech circuit, as broadly set forth, clearly indicates the principle of operation and in actual practice some variations in actual circuitry will be apparent. For example, the actual pathway of channel II can be from the volume control V2 directly to the gate circuit, with switch S6 acting only indirectly via the gating circuit.

The circuitry incorporated in and constituting the audiometry training unit of the invention will be apparent as will use thereof, by a student, and results in a conventional audiometer console, for example, linked to a pre-programmed simultated test subject. In use an infinite variety of audiometric test patterns may be selected by an instructor in a usage mode as hereinbefore defined. Multi-student instruction by means of auxiliary consoles is contemplated, as also provision of simulated experience in other audiometric tests such as loudness balance, S.I.S.I., tone decay, etc. The machine can be readily altered within the teachings of the invention to fit the needs of individual students for individualized instruction in basic audiometry, and at the same time permit the instructor more time to teach the professional aspects of hearing testing.

Manifestly, changes in details can be effected in the shown and described circuitry, and the mode of use of the unit can be varied, without departing from the spirit

We claim:
1. An audiometry training unit comprising:
   (A) A simulated pure tone circuit;
   (B) a speech circuit;
   (C) sound input means for said pure tone circuit;
   (D) sound input means for said speech circuit;
   (E) selectively controllable sound input control means for said tone and said speech circuits for regulating, modifying, and varying the respective input sounds; and
   (F) controlled sound output means for each said circuit.

2. An audiometry training unit as claimed in claim 1, including tone and speech mode selector switches in the respective circuits for selective left and right subject test circuit actuation.

3. An audiometry training unit as claimed in claim 2, including switch means for selective air or bone tone or speech circuit actuation.

4. An audiometry training unit as claimed in claim 3, including selective intensity frequency attenuator means for each said circuit.

5. An audiometry training unit as claimed in claim 4, including program switch means for each said circuit.

6. An audiometry training unit as claimed in claim 5, including response generators for each said circuit.

7. An audiometry training unit as claimed in claim 1, said sound input control means for pure tone circuit including a tone presentation switch, a holding circuit connected to said presentation switch, patient response generators in said circuit, said holding circuit being operable to maintain a respective generator in a set off or on state upon actuation of said presentation switch, a mode selector switch operable to establish a plurality of test channels for left or right air or bone testing, a patient response indicator, adjustable response delay circuit connected to said indicator, simulated test frequency selector means for each channel, and a program switch to set desired general intensity levels.

8. An audiometer training unit as claimed in claim 7, said frequency selector means comprising a ganged switch with a plurality of positions for said air and bone channels respectively marked with simulated test frequencies, a ganged attenuator switch coacting with said frequency selector switch and a program switch for each frequency, said program switch being adjustable to set a desired threshold response to a selected frequency.

9. An audiometer training unit as claimed in claim 1, said speech circuit including a tape recorder playback unit having two channels for use with pre-recorded tapes, a first said channel adapted for transmitting test intelligence and a second said channel response intelligence, ganged volume control means for tape playback output, a blanking gate circuit connected to said first channel and to an output selector switch, said output means being operable by said output selector switch.

10. An audiometer training unit as claimed in claim 9, a mode selector switch connected to said second channel for left or right speech channel selection, adjustable attenuator means for establishing a variable simulated intensity hearing level range, and a speech program switch operable to establish desired random responses.

11. An audiometer training unit as claimed in claim 10, said blanking circuit preventing crossover of a test signal from said second channel to said first channel to output in the absence of appropriate channel separation.

References Cited
UNITED STATES PATENTS

| | | | |
|---|---|---|---|
| 2,471,136 | 5/1949 | Allison | 179—1 |
| 3,107,440 | 10/1963 | Lovering | 179—1X |
| 3,310,883 | 3/1967 | Young | 35—10 |

HARLAND S. SKOGQUIST, Primary Examiner

U.S. Cl. X.R.
179—1